3,352,910
TRANS-1,2,3-CYCLOPROPANETRICARBOXAM-
IDES AND THEIR SYNTHESIS
Lowell R. Smith, St. Louis, and Angelo John Speziale,
Creve Coeur, Mo., assignors to Monsanto Company,
St. Louis, Mo., a corporation of Delaware
No Drawing. Filed Nov. 13, 1964, Ser. No. 411,116
8 Claims. (Cl. 260—557)

ABSTRACT OF THE DISCLOSURE

The compounds are of the class of trans-1,2,3-cyclopropanecarboxamides whose nitrogen atoms are tri-substituted, the synthesis of which being the reacting of potassium tert. butoxide with an N,N-substituted α-chloroacetamide in the presence of an inert organic solvent. These compounds are useful as fungicides.

---

This invention relates to the synthesis of trans-1,2,3,-cyclopropanetricarboxamides which materials are useful in the control of pathogenic fungal organisms which attack the foliage of growing vegetation.

In accordance with this invention it has been found that trans-1,2,3-cyclopropanetricarboxamides of the formula

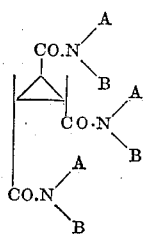

wherein A is alkyl of from 1 to 4 carbon atoms and wherein B is phenyl or alkyl of from 1 to 4 carbon atoms can be readily prepared by reacting potassium tert.-butoxide with an α-chloroacetamide of the formula

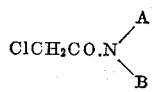

wherein A and B have the aforedescribed significance in the presence of an inert organic solvent.

Among the α-chloroacetamide reactants which provide for the trans-1,2,3-cyclopropanetricarboxamides of this invention are N,N-dimethyl-α-chloroacetamide
N,N-diethyl-α-chloroacetamide
N,N-diisopropyl-α-chloroacetamide
N,-di-n-butyl-α-chloroacetamide
N-methyl-N-ethyl-α-chloroacetamide
N-methyl-N-n-butyl-α-chloroacetamide
N-methyl-N-phenyl-α-chloroacetamide
N-ethyl-N-phenyl-α-chloroacetamide
N-sec.-butyl-N-phenyl-α-chloroacetamide and the various isomeric forms thereof.

In the process of this invention any inert organic solvent can be used, as for example benzene, toluene, xylene, tetrahydrofuran, cyclohexene, cyclohexane, hexane, diethyl ether, etc., and mixtures thereof.

Ordinarily in the process of this invention substantially equimolecular proportions of the respective reagents will be employed, however, greater amounts of either can be employed according to the designs of the manufacturer, e.g. a molar ratio of 0.5 to 2 of potassium tert.-butoxide to 1 of the α-chloroacetamide.

The reaction temperature can widely vary as long as it provides for a fluid system, that is a temperature above the freezing point of the system up to and including the system's boiling point. In general, however, a reaction temperature in the range of from about 0° C. to about 100° C. will provide optimum results. In general atmospheric pressure will be employed, however, pressures above or below atmospheric pressure can be employed.

To illustrate this invention but not limitative thereof is the following.

Example I

To a suitable reaction vessel equipped with a thermometer and agitator is charged 5.6 parts by weight (substantially 0.05 mol) of potassium tert.-butoxide and approximately 210 parts by weight of tetrahydrofuran. While agitating this mass 9.2 parts by weight (substantially 0.05 mol) of N-methyl-N-phenyl-α-chloroacetamide is slowly added. Upon completion of this addition the reaction mass is heated at approximately 50° C. for three hours. Thereafter the reaction mass is subjected to vacuum distillation at 20° C. and 25 mm. Thereafter the residue is extracted with hot methylene chloride and the extract washed with water and dried over anhydrous magnesium sulfate. Upon evaporating the methylene chloride there is obtained 3.1 parts by weight of trans-N,N',N''-trimethyl-1,2,3-cyclopropanetricarboxanilide, M.P. 209–210° C.

Example II

To a suitable reaction vessel equipped with a reflux condenser, thermometer and agitator is charged 18.4 parts by weight (substantially 0.1 mol) of N-methyl-N-phenyl-α-chloroacetamide, approximately 41 parts by weight of cyclohexene and approximately 144 parts by weight of diethyl ether. While agitating 16.8 parts by weight (substantially 0.15 mol) of potassium tert.-butoxide is slowly added. Upon completion of this addition the reaction mass is agitated for about two hours while maintaining the temperature below 40° C. The mass is then refluxed for 30 minutes. The reaction mass is then cooled by the addition of approximately 100 parts by weight of cold water and filtered. The filter cake is then recrystallized from a mixture of methylene chloride and hexane to give 16.3 parts by weight of trans-N,N',N''-trimethyl-1,2,3-cyclopropanetricarboxanilide, M.P. 209–210° C.

Example III

Employing the procedure of Example I but replacing N-methyl-N-phenyl-α-chloroacetamide with an equimolecular amount of N-ethyl-N-phenyl-α-chloroacetamide there is obtained trans-N,N',N''-triethyl-1,2,3-cyclopropanetricarboxanilide.

Example IV

Employing the procedure of Example II but replacing N-methyl-N-phenyl-α-chloroacetamide with an equimolecular amount of N-isopropyl-N-phenyl-α-chloroacetamide there is obtained trans-N,N',N''-triisopropyl-1,2,3-cyclopropanetricarboxanilide.

Example V

Employing the procedure of Example I but replacing N-methyl-N-phenyl-α-chloroacetamide with an equimolecular amount of N-isobutyl-N-phenyl-α-chloroacetamide there is obtained trans-N,N',N''-triisobutyl-1,2,3-cyclopropanetricarboxanilide.

Example VI

To a suitable reaction vessel equipped with a reflux condenser, thermometer and agitator is charged approximately 70 parts by weight of tetrahydrofuran and 18.6 parts by weight of potassium tert.-butoxide (substantially 0.1 mol) in the form of a fifty-fifty mixture with tert.-butanol. While agitating 12.1 parts by weight (substantially 0.1 mol) of N,N-dimethyl-α-chloroacetamide is added dropwise while maintaining the temperature at about 0° C. The mass is then agitated at about 0° C. for 30 minutes and then refluxed for 30 minutes. The mass is then filtered and the tetrahydrofuran evaporated under vacuum. The residue is then placed on a column of neutral alumina packed wet with pentane. Elution with pentane gives liquid fractions which are combined and subjected to distillation at 20° C. and 25 mm. The residue is then recrystallized from a mixture of hexane and methylene chloride to give trans-N,N,N',N',N'',N''-hexamethyl-1,2,3-cyclopropanetricarboxamide, M.P. 116–118° C.

*Example VII*

Employing the procedure of Example VI but replacing N,N-dimethyl-α-chloroacetamide with an equimolecular amount of N,N-diethyl-α-chloroacetamide there is obtained trans - N,N,N',N',N'',N''-hexaethyl-1,2,3-cyclopropanetricarboxamide.

*Example VIII*

Employing the procedure of Example VI but replacing N,N-dimethyl-α-chloroacetamide with an equimolecular amount of N-methyl-N-ethyl-α-chloroacetamide there is obtained trans - N,N',N''-triethyl-N,N',N''-trimethyl-1,2,3-cyclopropanetricarboxamide.

*Example IX*

Employing the procedure of Example II but replacing N-methyl-N-phenyl-α-chloroacetamide with an equimolecular amount of N,N-di-n-butyl-α-chloroacetamide there is obtained trans-N,N,N',N',N'',N''-hexa-n-butyl - 1,2,3-cyclopropanetricarboxamide.

*Example X*

Employing the procedure of Example II but replacing N-methyl-N-phenyl-α-chloroacetamide with an equimolecular amount of N-isobutyl-N-methyl-α-chloroacetamide there is obtained trans-N,N',N''-triisobutyl-N,N',N''-trimethyl-1,2,3-cyclopropanetricarboxamide.

The trans-1,2,3-cyclopropanetricarboxamides of this invention are useful as foliage fungicides. In a representative fungicidal evaluation trans-N,N',N''-trimethyl-1,2,3-cyclopropanetricarboxanilide was found to be 100% toxic against *Venturia inaequalis* at a concentration of 10 p.p.m. and about 80% toxic against *Phytophthora infestans* at a concentration of 10 p.p.m.

While this invention has been described with respect to certain embodiments it is to be understood that it is not so limited for variations and modifications thereof can be made which are obvious to those skilled in the art without departing from the spirit or scope of this invention.

What is claimed is:

1. A trans-1,2,3-cyclopropanecarboxamide of the formula

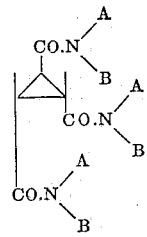

wherein A is alkyl of from 1 to 4 carbon atoms and wherein B is selected from the group consisting of phenyl and alkyl of from 1 to 4 carbon atoms.

2. Trans-N,N',N''-trimethyl-1,2,3 - cyclopropanetricarboxanilide.

3. Trans-N,N',N''-triethyl - 1,2,3 - cyclopropanetricarboxanilide.

4. Trans - N,N,N',N',N'',N'' - hexamethyl-1,2,3-cyclopropanetricarboxamide.

5. Trans-N,N,N',N',N'',N''-hexaethyl-1,2,3 - cyclopropanetricarboxamide.

6. A method of making a compound of claim 1 which comprises reacting potassium tert.butoxide with an α-chloroacetamide of the formula $$ClCH_2CO.N\begin{matrix}A\\B\end{matrix}$$

wherein A is alkyl of from 1 to 4 carbon atoms and wherein B is selected from the group consisting of phenyl and alkyl of from 1 to 4 carbon atoms in the presence of an inert organic solvent.

7. A method of making trans-N,N',N''-trimethyl-1,2,3-cyclopropanetricarboxanilide which comprises reacting potassium tert.-butoxide with N-methyl-N-phenyl-α-chloroacetamide in the presence of an inert organic solvent.

8. A method of making trans-N,N,N',N',N'',N''-hexamethyl - 1,2,3 - cyclopropanetricarboxamide which comprises reacting potassium tert.-butoxide with N,N-dimethyl-α-chloroacetamide in the presence of an inert organic solvent.

References Cited

Hoffman et al.: Jour. Amer. Chem. Soc., vol. 74, pp. 5485–7 (1952).

WALTER A. MODANCE, *Primary Examiner.*

N. TROUSOF, *Assistant Examiner.*